R. CAWTHORNE.

Tire Setter.

No. 78,926.

Patented June 16, 1868.

WITNESSES:

INVENTOR:

Robert Cawthorne

United States Patent Office.

ROBERT CAWTHORNE, OF LYONS, IOWA.

Letters Patent No. 78,926, dated June 16, 1868.

IMPROVEMENT IN TIRE-SETTER.

*The Schedule referred to in these Letters Patent and making part of the same.*

TO ALL WHOM IT MAY CONCERN:

Be it known that I, ROBERT CAWTHORNE, of Lyons, Clinton county, State of Iowa, have invented a new and useful Device for Setting Tire on Wheels; and I do hereby declare that the following is a full, clear, and correct description of the same, reference being had to the accompanying drawings, and to letters of reference marked thereon.

The nature of my invention consists in arranging a tub of water, with a circular platform made adjustable by means of a screw-standard passing through a step, and so arranged that after heating the tire and placing it on the wheel, it may be immersed in the water to cool and shrink uniformly.

It further consists in a peculiar arrangement of an adjustable nut on the screw-standard and the platform, so as to regulate the dish of the wheel. It can be so arranged that any number of wheels can be made to have precisely the same dish, thus having all the wheels of a vehicle of a uniform dish, or without any dish, and by this convenient arrangement, enabling one to accomplish a large amount more of work in a given time, thus saving expense and furnishing a better quality of work.

In order to enable others to correctly understand my invention, and to construct and use the same, I will carefully describe its construction and operation.

In the drawings, the same letters refer to the same parts of the device.

A represents the tub or reservoir.

B represents flange to tub.

C represents rests for platform.

D represents a tightening-nut with a handle.

E represents a screw-standard.

F represents the water.

H represents the step for standard E to work in.

J represents the platform.

K represents the wheel.

L represents the tire.

O represents the adjustable nut.

P represents the frame for platform.

R represents the water-line.

S represents the braces that support the platform J.

Figure 1:
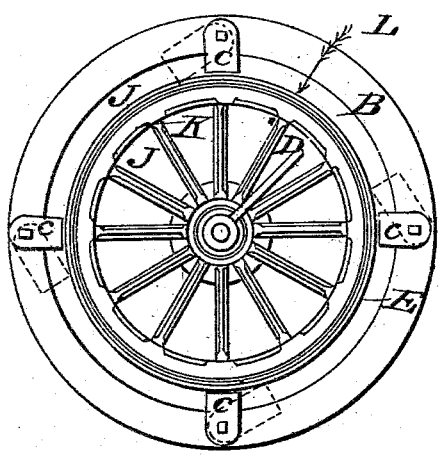
Figure 1 represents a top view or plan.
Figure 2:
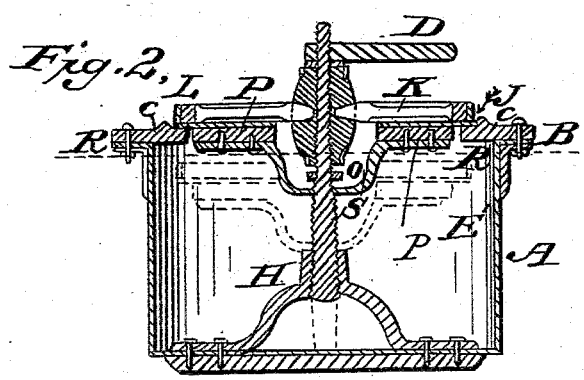
Figure 2 represents a vertical section through the centre.
Figure 3:
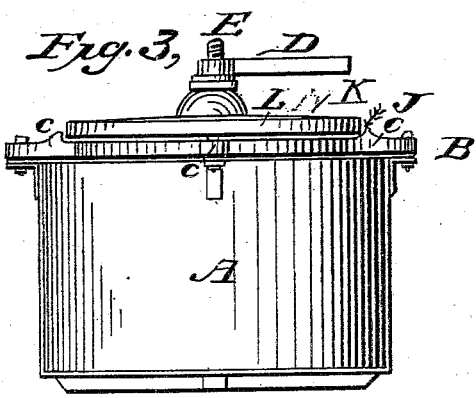
Figure 3 represents an elevation.

I construct the tub or reservoir A of any suitable material and any desired size. To the bottom of this tub, and in its centre, I place a step, supported by legs, as indicated by Fig. No. 2 at H. In this step I put a standard, fitting it to the step H by means of a screw. On this standard I also have a nut fitting the standard by means of a screw, as at O, fig. 2. Also, to this standard, I firmly attach the braces or arms that support the platform J, as shown at S, fig. 2. I have fitted to the top of standard E a tail-nut, as shown at D, fig. 3. I construct rests for the platform, fitting the same to turn easily on bolts, as indicated at c c c c, fig. 1, and the dotted lines there shown.

Now, the operation of my device is as follows: In order to set the tire and uniformly adjust the dish of the wheels, I place the wheel on the platform J, the standard E passing through the hub. I turn the nut O up against the lower end of the hub, then I turn the tail-nut D down firmly against the hub, thus confining the wheel against the platform J and the nut O. Now, having the tire heated, I place it in its place on the rim of the wheel, against the platform J. Now, turn back the standard E so as to relieve the rests c c c c, turn them as indicated by the dotted lines in fig. 1, then turn the platform J, with wheel K and standard E, down the standard E, passing down through the step H, carrying with it the wheel on the platform into the water F, as indicated by the dotted lines in fig. 2. The water quickly cooling the tire, it contracts, and the wheel being firmly confined in a fixed position by nuts O and D, it cannot twist or dish only as designed in shaping the wheel, and by the tire coming in contact with the water uniformly, it prevents burning the wood in one place while cooling in another. Now, it will be seen that any number of wheels can be made of precisely the same dish, for by turning the tail-nut D back, the tire, in contracting, will make more dish by raising the hub against the nut.

Now, to remove the wheel, turn the platform J up by turning back the standard E, and it will carry up with it the wheel and the platform to the proper height for rests c c c c to come under it. Remove the wheel, and place on another, pursuing the same operation, and leaving the nut O in same place on standard E, the wheels will be all uniform in dish.

What I claim as my invention, and desire to secure by Letters Patent, is—

1. The rests c c c c, for the purpose specified.

2. The arrangement and combination of the rests c c c c with the tub A, step H, standard E, platform J, nuts D and O, when operating substantially as and for the purposes herein set forth and specified.

ROBERT CAWTHORNE.

Witnesses:
 WM. W. SANBORN,
 THOS. LEEDHAN.